(12) United States Patent
Costa

(10) Patent No.: US 12,323,461 B2
(45) Date of Patent: Jun. 3, 2025

(54) DETECTION OF SITE PHISHING USING NEURAL NETWORK-ENABLED SITE IMAGE ANALYSIS LEVERAGING FEW-SHOT LEARNING

(71) Applicant: Akamai Technologies, Inc., Cambridge, MA (US)

(72) Inventor: Nadav George Costa, Ramat Gan (IL)

(73) Assignee: Akamai Technologies, Inc., Cambridge, MA (US)

( * ) Notice: Subject to any disclaimer, the term of this patent is extended or adjusted under 35 U.S.C. 154(b) by 324 days.

(21) Appl. No.: 18/135,778

(22) Filed: Apr. 18, 2023

(65) Prior Publication Data

US 2024/0356967 A1    Oct. 24, 2024

(51) Int. Cl.
*H04L 9/40* (2022.01)
*G06V 10/82* (2022.01)

(52) U.S. Cl.
CPC ......... *H04L 63/1483* (2013.01); *G06V 10/82* (2022.01)

(58) Field of Classification Search
None
See application file for complete search history.

(56) References Cited

U.S. PATENT DOCUMENTS

| | | | | |
|---|---|---|---|---|
| 11,146,576 B1* | 10/2021 | Mushtaq | ............. | H04L 63/1416 |
| 11,184,393 B1* | 11/2021 | Gendre | ............... | G06F 16/2379 |
| 11,496,510 B1* | 11/2022 | Orhan | ................ | H04L 63/1483 |
| 11,528,297 B1* | 12/2022 | Chiaraviglio | ....... | H04L 63/1483 |
| 12,177,251 B1* | 12/2024 | Depaolo | ................ | G06N 20/00 |
| 12,265,990 B2* | 4/2025 | Kim | .................... | G06Q 30/0185 |
| 2014/0331119 A1* | 11/2014 | Dixon | ................... | G06F 21/567 715/234 |
| 2016/0063218 A1* | 3/2016 | Nachenberg | ........... | G06Q 30/00 726/26 |
| 2016/0253679 A1* | 9/2016 | Venkatraman | ..... | G06Q 30/0185 705/310 |
| 2019/0014148 A1* | 1/2019 | Foster | ................. | H04L 63/0209 |
| 2021/0182628 A1* | 6/2021 | Regina | ................... | G06N 3/045 |
| 2021/0248624 A1* | 8/2021 | Keren | .................. | G06Q 50/184 |
| 2022/0070216 A1* | 3/2022 | Kohavi | ............... | H04L 63/1416 |
| 2022/0385694 A1* | 12/2022 | Zverkov | .............. | G06V 10/751 |

(Continued)

OTHER PUBLICATIONS

Schroff, et al., "FaceNet: A Unified Embedding for Face Recognition and Clustering," Proceedings of the IEEE Computer Society Conference on Computer Vision and Pattern Recognition 2015, https://arxiv.org/abs/1503.03832.

(Continued)

*Primary Examiner* — Khang Do
(74) *Attorney, Agent, or Firm* — David H. Judson

(57) ABSTRACT

Website phishing detection is enabled using a siamese neural network. One twin receives a query image associated with a website page. The other twin receives a subset of a set of reference website images together with positive (phishing) examples that were used to train the networks, the subset of reference website images having been determined by applying an identifier associated with a brand of interest. The operation of applying the identifier significantly reduces the relevant search space for the inferencing task. If the inferencing determines a sufficient likelihood that the website page is a phishing page, control signaling is generated to control a system to take a given mitigation action n.

22 Claims, 15 Drawing Sheets

(56) References Cited

U.S. PATENT DOCUMENTS

2024/0121242 A1* 4/2024 Miyake ................ H04L 63/102
2025/0106249 A1* 3/2025 Graziano ............... H04L 51/18

OTHER PUBLICATIONS

Forouzesh, et al., "Disparity Between Batches as a Signal for Early Stopping," ECML/PKDD 2021 https://arxiv.org/abs/2107.06665.
Woo, et al., "CBAM: Convolutional Block Attention Module," arXiv:1807.06521v2 [cs.CV] Jul. 18, 2018.
"TensorFlow Addons Losses: TripletSemiHardLoss," May 2023 https://www.tensorflow.org/addons/tutorials/losses_triplet.
Grana, et al., "Spotting brand impersonation with Swin transformers and Siamese neural networks," Microsoft Security, 2021.

* cited by examiner

FIG. 4B

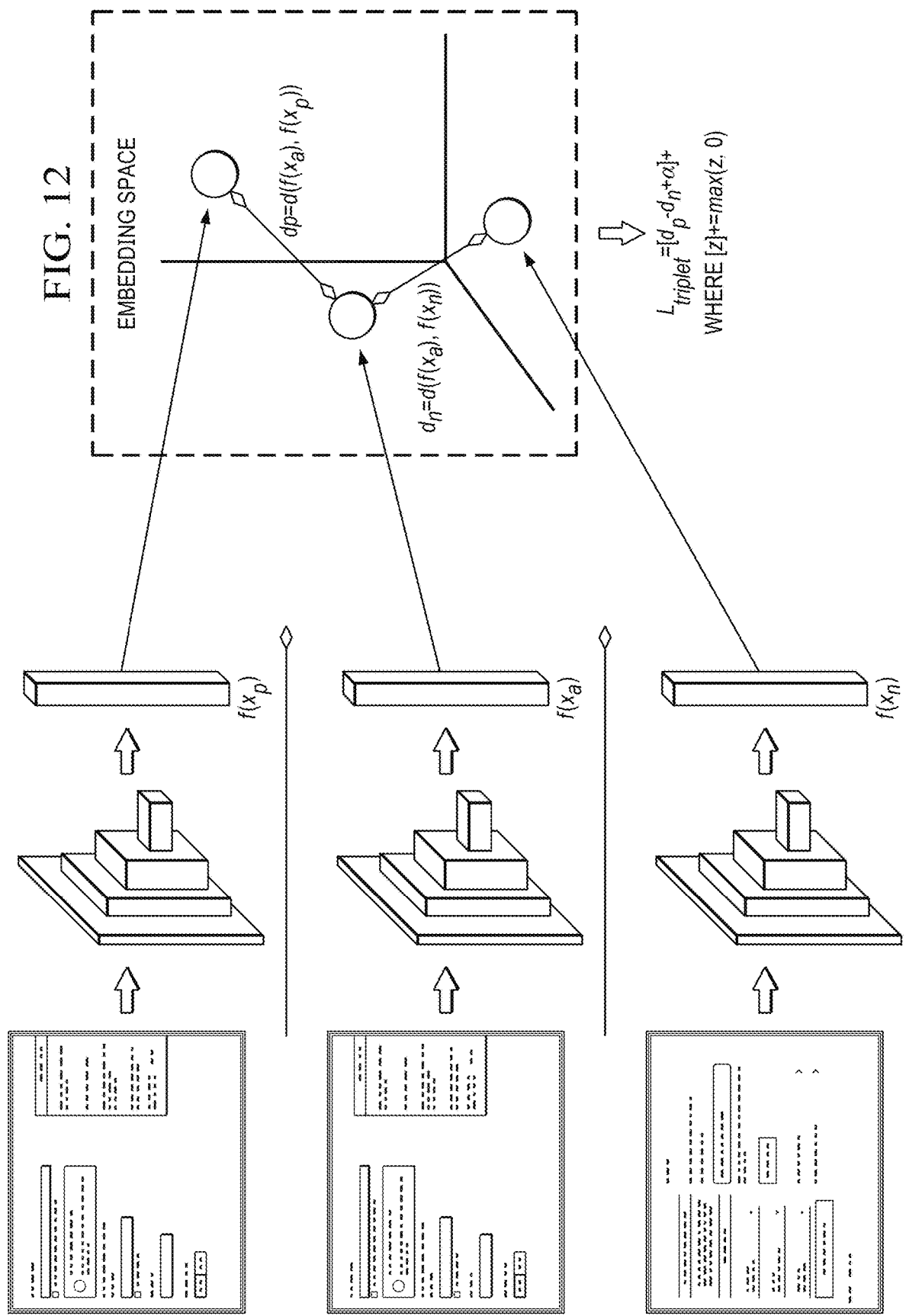

DETECTION OF SITE PHISHING USING NEURAL NETWORK-ENABLED SITE IMAGE ANALYSIS LEVERAGING FEW-SHOT LEARNING

BACKGROUND

Technical Field

This application relates generally to network security and, in particular, to techniques that detect phishing attacks on websites.

Brief Description of the Related Art

Phishing is a type of social engineering where an attacker sends a fraudulent (e.g., spoofed, fake, or otherwise deceptive) message designed to trick a person into revealing sensitive information to the attacker, or to deploy malicious software (like ransomware) on the victim's infrastructure. Phishing attacks have become increasingly sophisticated, and they often transparently mirror the site being targeted, thereby allowing the attacker to observe everything while the victim is navigating the site, and to transverse any additional security boundaries with the victim.

Typically, a phishing website will show high resemblance to a reference targeted benign website. An advantage of deploying a phishing website with high similarity to the corresponding benign website is to gain a high level of disguise regarding what the purpose of the website really is. For defenders, this characteristic is considered as an advantage, because it enables the phishing detection problem to be translated into a problem of image similarity detection. That said, the detection of phishing web pages via page comparisons (usually a front page comparison), although very intuitive, often becomes prohibitive whenever the bank of reference benign website pages is very large.

BRIEF SUMMARY

According to this disclosure, website phishing detection is enabled using deep learning. The technique leverages the assumption that often phishing websites visually mimic a targeted benign webpage to a level where it is hard or even impossible to tell that a malicious website has been loaded. To address the problem of phishing detection in this context, the approach described herein provides an algorithm that processes a query website image (typically a site front page) against a bank of predefined reference website pages (or "anchors") and correlates similarity matching with phishing detections. To this end, a detection system leverages the architecture of a neural twin network (or "siamese" NN) for comparing screenshots of website pages for phishing detection. In a particular implementation, one twin is fed with a query website page image while the other twin is fed with a pertinent set of reference website images (anchors) against which the query image is compared. The pertinent set of relevant anchors is retrieved from a bank of anchors, e.g., by utilizing an identifier signal, such as an identifier of brands in the system. By relying on the brand identifier, there is a guarantee that the system's computational complexity for predictions is not dependent on the size of the complete anchors bank. This feature allows the system to support an unbounded brand space without impacting that computational complexity. When the inferencing determines a sufficient likelihood that the query image is a phishing page, control signaling is returned and used to cause a given mitigation action to be taken with respect to subsequent requests for the site or page.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIGS. 4A-4D depict several examples showing how phishing websites closely resemble their targeted benign websites;

FIG. 4 depicts several examples showing how phishing websites closely resemble their targeted benign websites;

FIG. 12 depicts an embedding of a triplet of images (anchor, positive and negative) under a criteria of triplet loss and that is used for training the neural network according to another aspect of this disclosure.

DETAILED DESCRIPTION

Figure 1:
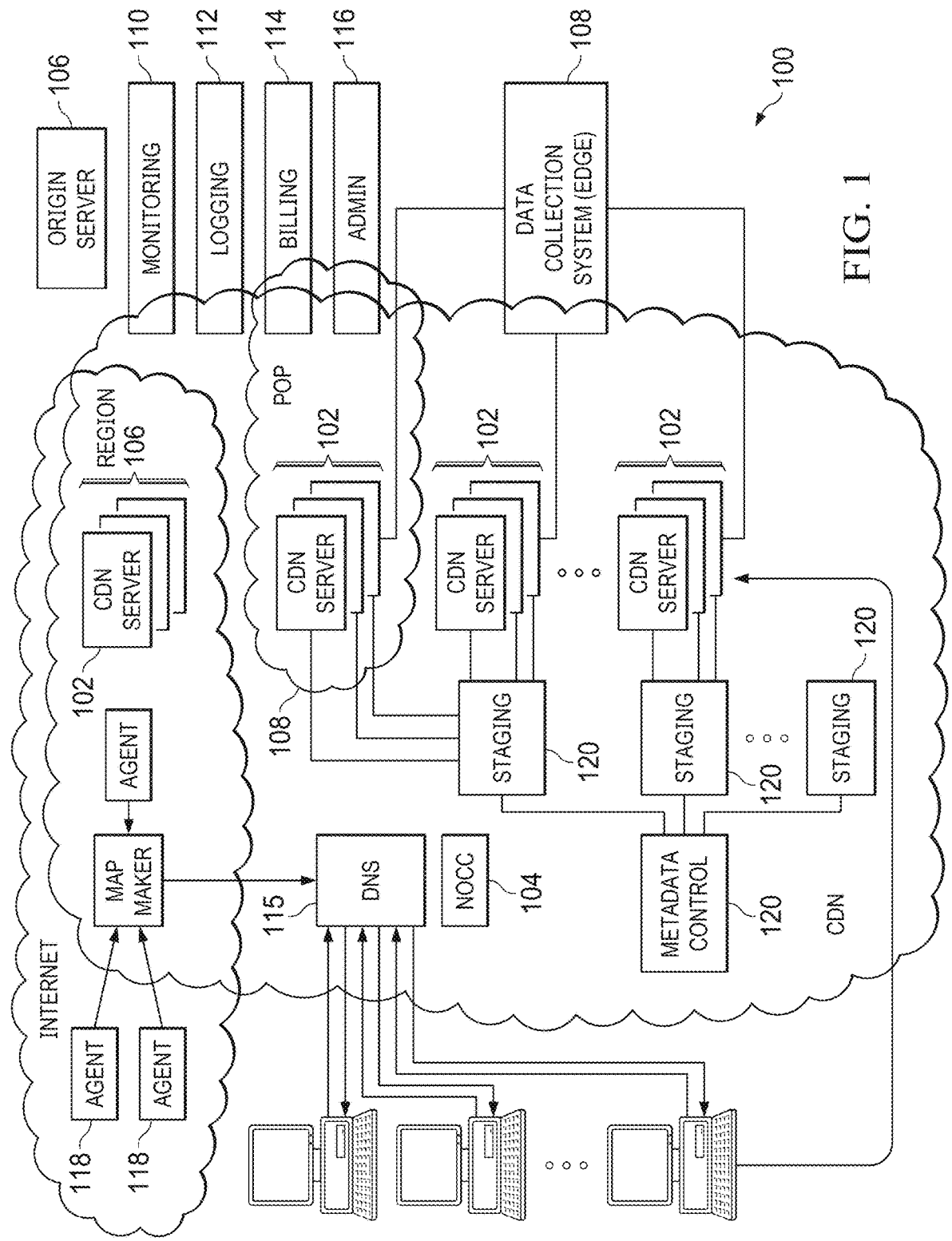
FIG. 1 is a block diagram illustrating a known distributed computer system configured as a content delivery network (CDN)

A representative system in which phishing detection for websites is implemented according to this disclosure is depicted in FIG. 1. In this example, the system is a content delivery network (CDN) that is a shared infrastructure provided by a service provider and that is used by content providers to deliver their websites or web applications. A representative service provider is Akamai Technologies, Inc. of Cambridge, Massachusetts. The implementation in a CDN is not intended to be limited, as the techniques herein may be practiced in any type of computer system, in a standalone manner or in association with a website or web application, or as a particular function of some other computer-implemented system, device, process, or the like.

In this known system, such as shown in FIG. 1, a distributed computer system 100 is configured as a CDN (a specific type of overlay network) and comprises a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
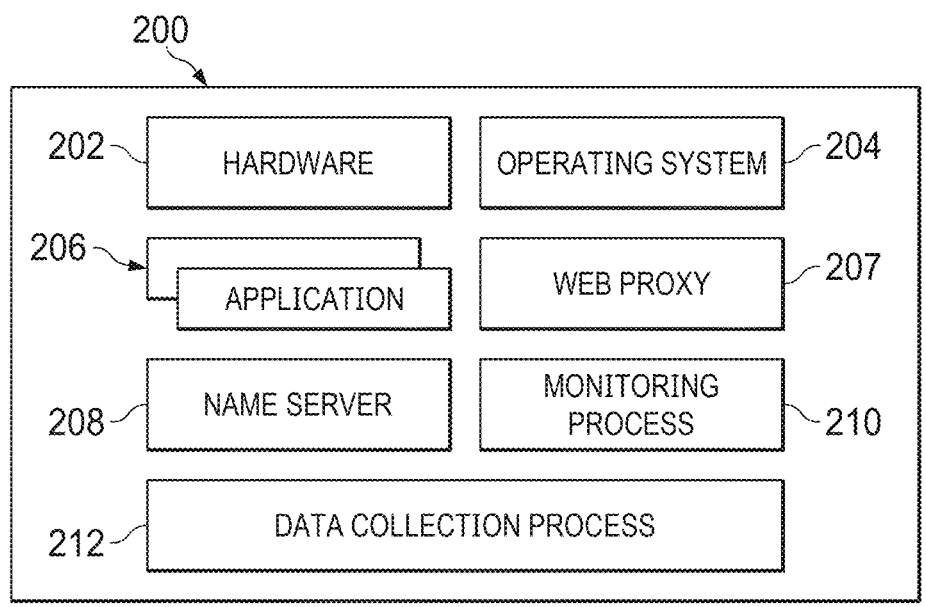
FIG. 2 is a representative machine configuration in which the techniques of this disclosure may be practiced.

As illustrated in FIG. 2, a given edge or back-end machine 200 comprises commodity hardware (e.g., an Intel® processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a global host process), a name server 208, a local monitoring process 210, a distributed data collection process 212, and the like. The HTTP proxy 207 or "edge server") serves web objects, streaming media, software downloads and the like. A CDN edge server is configured to provide one or more extended content delivery features, preferably on a domain-specific, customer-specific basis, preferably using configuration files that are distributed to the edge servers using a configuration system. For example, a given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN also typically includes or leverages other back-end infrastructure distinct from the edge servers. The infrastructure may comprise part of the overlay network, part of a separate cloud-based architecture, or some hybrid. Without intending to be limiting, typically both the phishing detection training and the phishing detection as described below occur in the back-end infrastructure, which usually is implemented in a cloud-based computing system.

Figure 3:
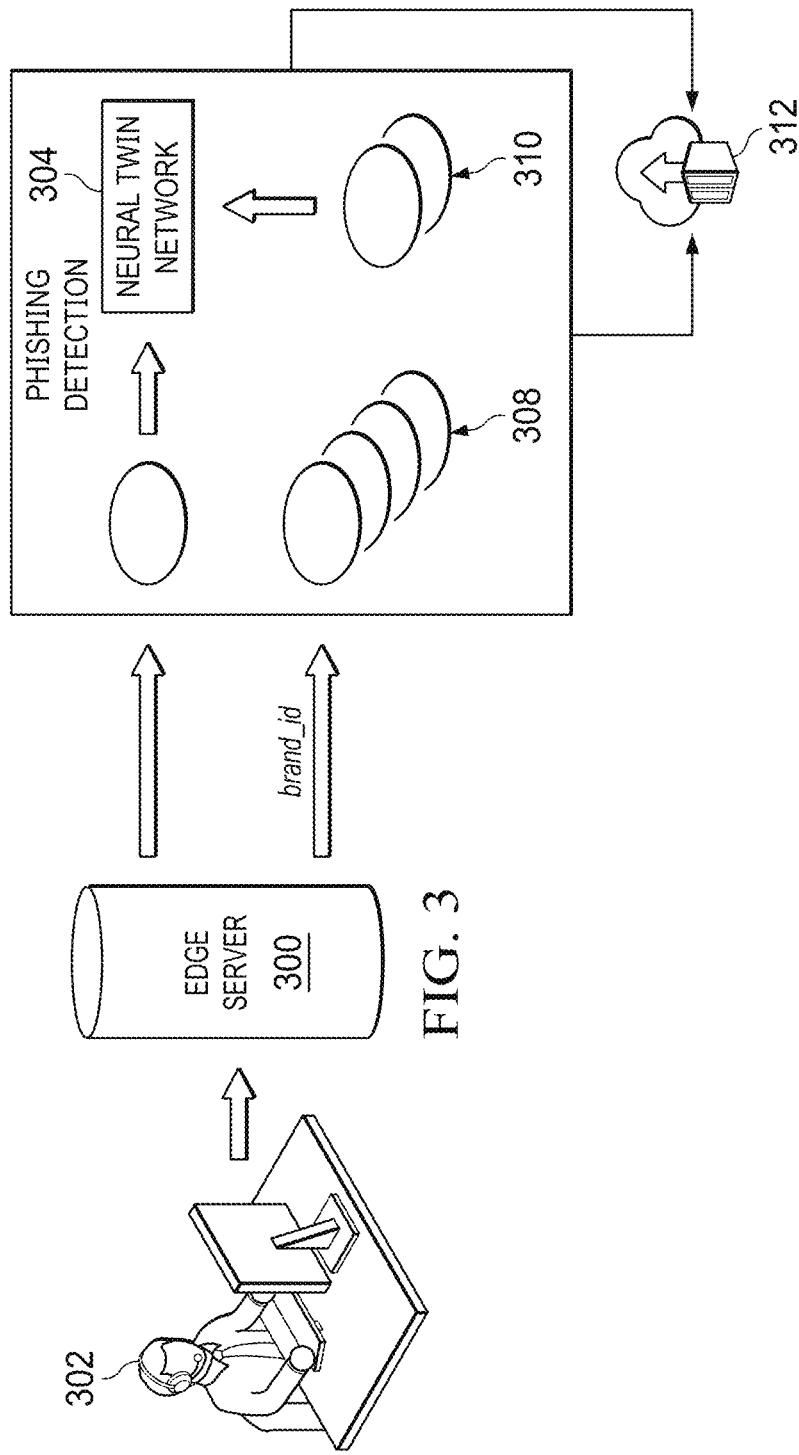

FIG. 3 depicts a representative implementation for phishing detection according to this disclosure. In this example, a cloud-based computing system 300, which may have distributed components, is configured to perform the phishing detection. In a typical operation, the cloud-based computing system 300 operates in response to a security event that has been triggered, typically from an edge server. In particular, typically the CDN service provider provisions a security policy (which may be customer-specific) that is then enforceable at the CDN edge servers. Based on the security policy, an event or occurrence associated with the edge server may trigger a security event; in this example, the event is receipt at the edge server of a request to access a site that has been configured by the CDN to be protected against phishing attacks. The particular nature of the security policy or event are not aspects of this disclosure. That said, upon receipt of a security event, the computing system 300 performs an analysis to determine whether a phishing attack may be underway. To this end, the computing system 300 opens or instructs a web browser instance 302 (e.g., Puppeteer) to retrieve the page at issue. In this example embodiment, the web browser instance runs as a headless browser, such as Headless Chrome. The computing system receives the page, and performs a screen capture, sometimes referred to herein as a screenshot 303, and forwards the resulting image (as a query image) to an analysis component 304. Typically, the query image is an image that captures the visibility of the front page of the request site. As depicted, the analysis component 304 has associated therewith a deep learning model 306 from which inferencing on the page is carried out.

As will be described below, and before inferencing, preferably the computing system 300 applies an identifier 308 to a dataset 310 associated with a set of reference website images (known herein as "anchors") to identify a reduced dataset 312 that corresponds to a potentially-relevant subset of that set of reference website images. In this embodiment, the identifier is a brand identifier (brand_id) associated with a CDN customer, and typically this identifier is obtained from a data feed of such information produced by the service provider. In this example, the data feed is generated from log data obtained across edge servers in the network, or the feed may comprise configuration or other data associated with the set of content providers that use the CDN for delivery of the websites and web applications, or from some other data source.

The model 306 is a neural twin network that has been trained to perform inferencing. The neural twin network is also referred to herein as a siamese neural network. Details of this training are provided below. In a preferred embodiment, and as will also be described further, the Siamese neural network is in practice a single neural network that is operated twice to facilitate the actual inferencing, wherein a first instance of the network receives the query image and its twin (the second instance) receives the pertinent set of anchors (reference website images) against which the query image is compared. An alternative to operating the single neural network twice is to use two identical networks. Based on this comparison, which occurs in real-time, the analysis component can determine whether the image matches sufficiently with any of the anchors, thus indicating that security event that triggered the analysis is likely to be associated with a phishing attack. A comparison of the query image against the subset of anchors typically generates a matching score; if the matching score exceeds some configurable threshold, the score together with matched anchor is returned from the computing system. The threshold may be varied based on other learning, or from statistical information generated by the system in the course of time. When a match is indicated, the system may then provide signaling back to the CDN edge servers to take a mitigation action (e.g., blocking any subsequent request for the site or page, issuing a notification, requesting a takedown of the phishing website, delivering any subsequent to a sandbox for further evaluation, performing a logging operation, or the like). The mitigation action may be defined in the applicable security policy. This completes the processing.

While (as depicted in FIG. 3 and described above) the inferencing is carried out at the cloud-based computing system, this is not a requirement. In a variant embodiment, an edge network is configured with sufficient computational, storage and memory capability to support one or more of the above-described processing flow.

Figure 4A:
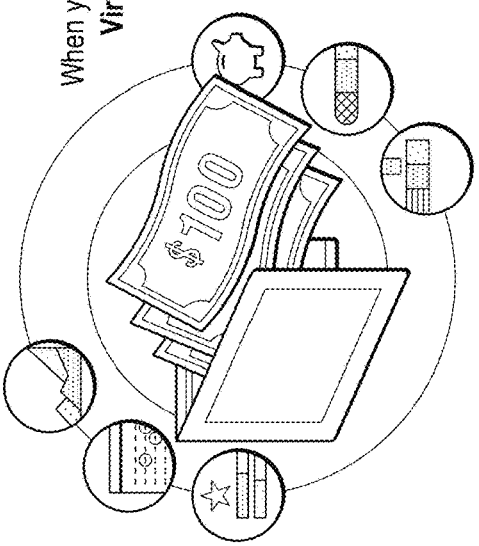
Figure 4B:
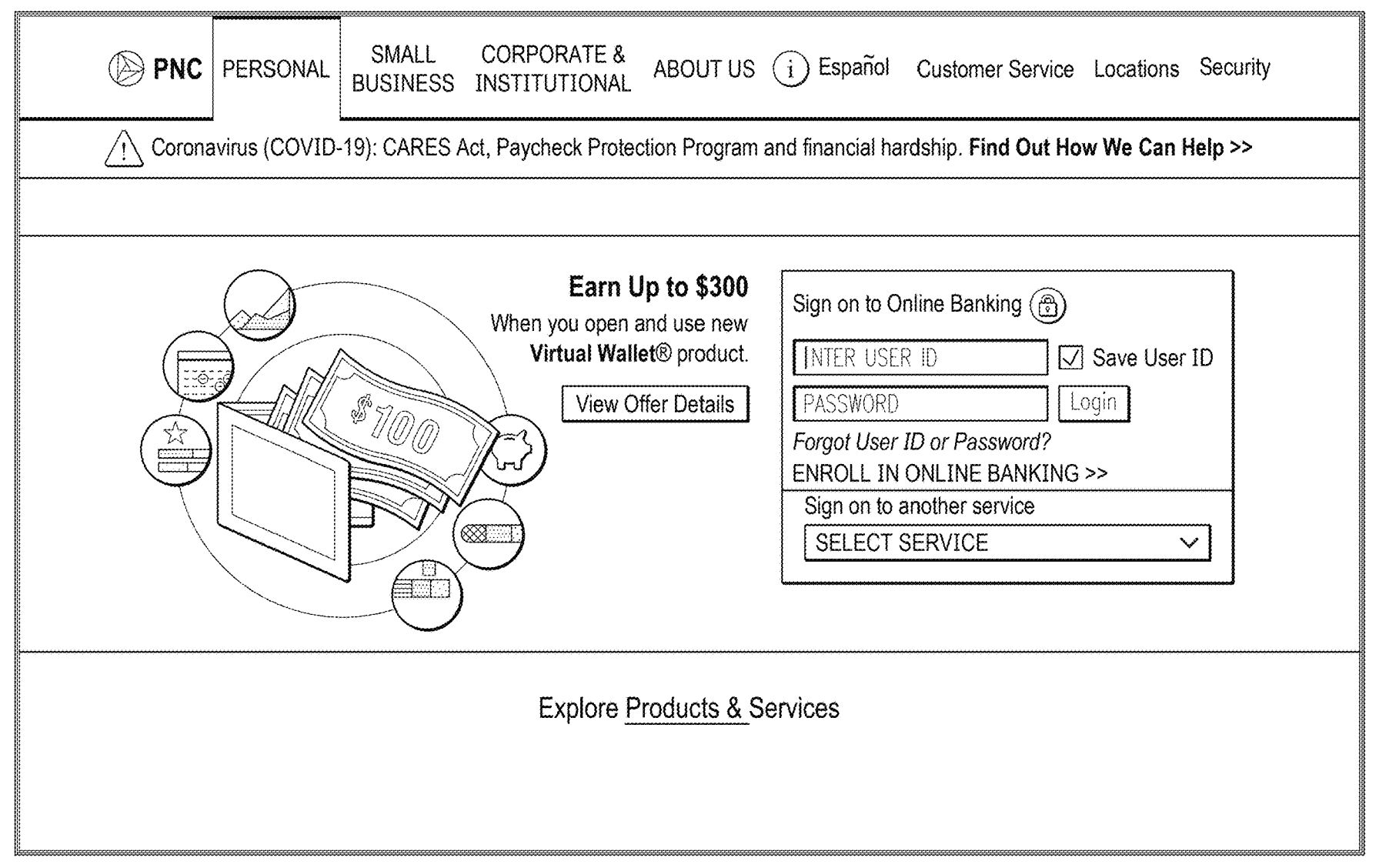
Figure 4C:
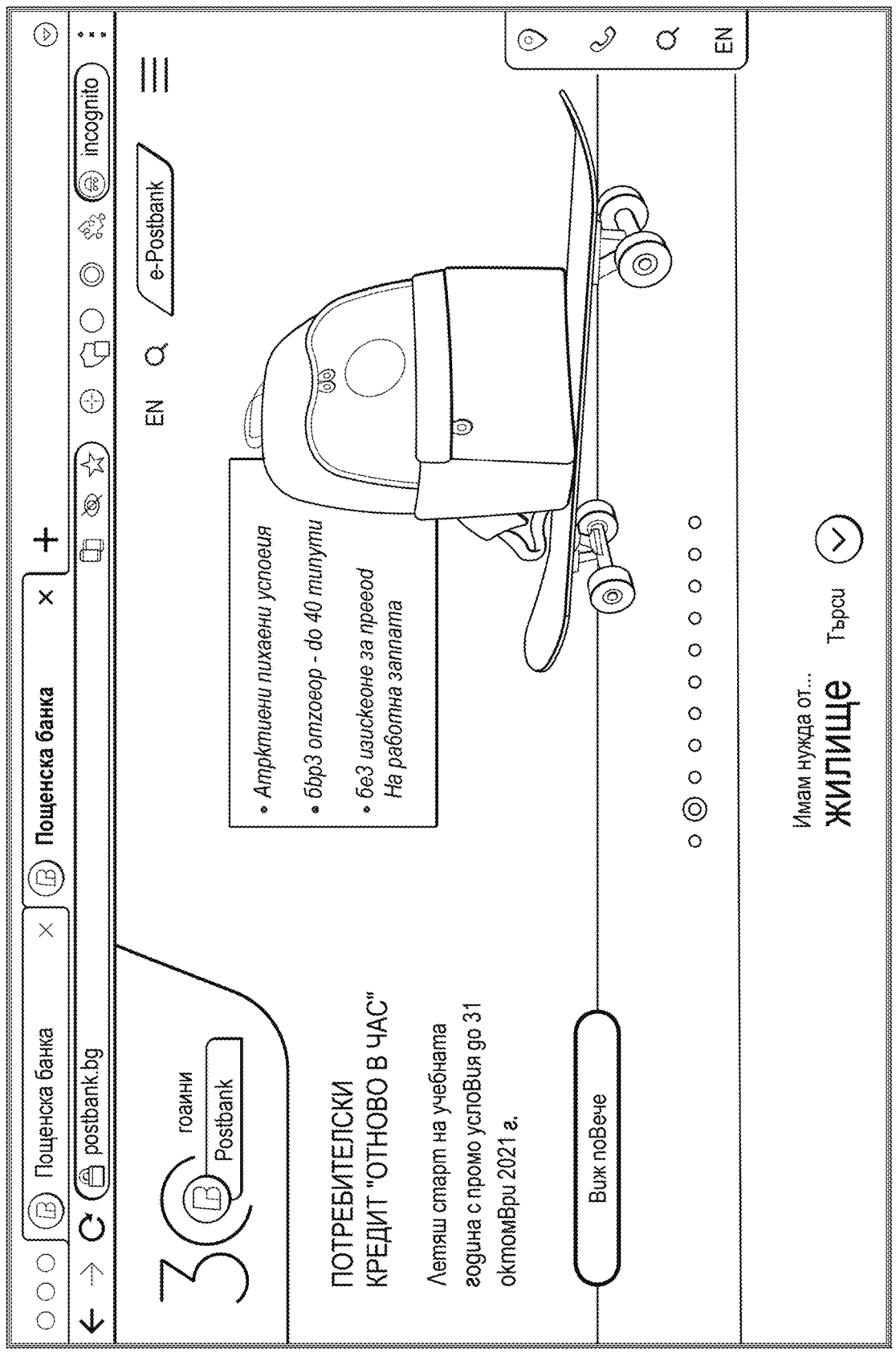
Figure 4D:
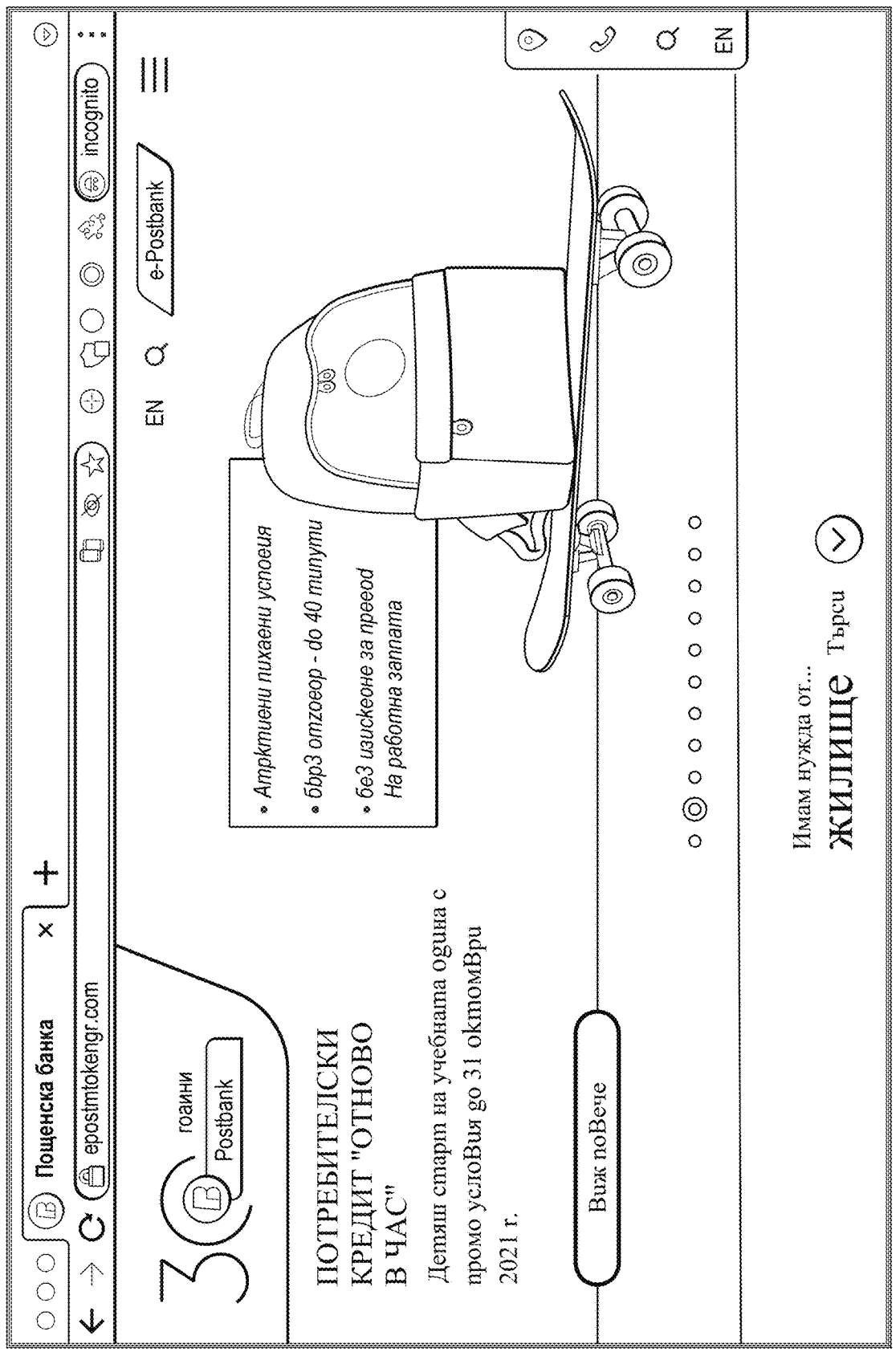

FIGS. 4A-4D depict the underlying issue that the above-described processing flow seeks to address. In particular, these figures depict two pairs (FIG. 4A-4B, and FIG. 4C-4D) of website images (screenshots), an original website (FIG. 4A, and FIG. 4C), and its counterpart phishing website (FIG. 4B, and FIG. 4D). The visual resemblance in each pair is apparent. According to an aspect of this disclosure, however, the fact that a phishing website is deployed with high similarity to the corresponding benign website is considered as an advantage, as it enables a mapping of the phishing detection problem into a problem of image similarity. According to an aspect of this disclosure described above, the detection of phishing web pages is achieved even when the anchors bank is very large. This advantage is achieved by performing inferencing on a reduced set of reference website images, which reduces the applicable search space that is explored during the inferencing process. To this end, and as previously described, this advantage is enabled by leveraging of an identifier (e.g., a brand identifier) that allows the system to reduce the set-size of the reference pages to compare against, namely, by retrieving only the reference front page that correspond to the given customer identifier. At prediction time, the inference of similarity of a query page image (a screenshot) is then computed by the siamese neural network. Typically, and as noted above, the siamese neural network is a single network that is operated twice; one twin is fed with a query website page image while the other twin is fed with a pertinent set of reference website images (anchors) against which the query image is compared. The inferencing (comparing the query image with the bank of anchors) occurs in real-time and is carried out in a computationally-efficient and memory-efficient manner.

Figure 5:
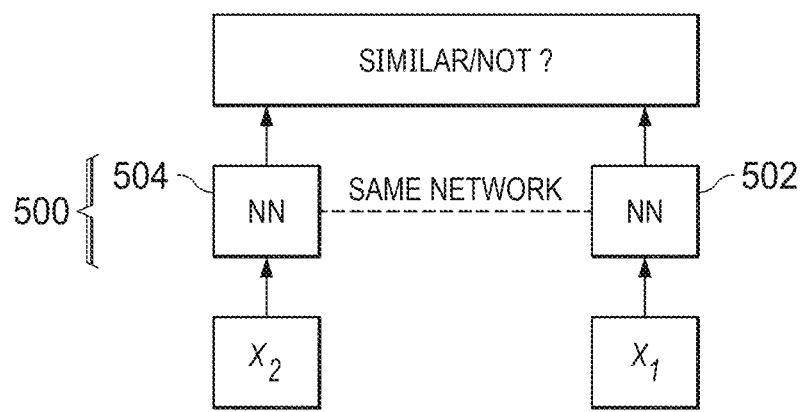
FIG. 5 depicts a generalized architecture of a siamese neural network that is used for phishing detection herein.

FIG. 5 depicts the high level architecture of the Siamese neural network 500. As depicted, the siamese neural network is logically two identical neural networks 502, and 504 and that share the exact same weight parameters. This arrangement enables the siamese neural network to determine a level of similarity between the two inputs $x_2$ and $x_1$. The input $x_2$ represents the query image, and the input x/represents the set of reference website images (the anchors) against which the query is being evaluated. According to an aspect of this disclosure, and as was mentioned above, the anchors that are fed to the neural network are determined by the identifier of the brand/customer that the query screenshot is associated with. In this example embodiment, the customer utilizes the CDN for site delivery, and thus the CDN systems generate the identifier (brand_id) A representative identifier may be a customer-supplied identifier, a CDN-supplied identifier (e.g., a contract number, a billing code, or the like), a customer domain or sub-domain, or some other name or identifier uniquely associated with the customer or brand of interest. For a typical data point $x_1$, the system performs phishing detection by estimating the value of a conditional probability p(phishing|brand_id). In a variant embodiment, when no identifier is available, the candidate screenshot may be compared to all anchors in the anchors bank if there are sufficient computational resources available.

Figure 6:
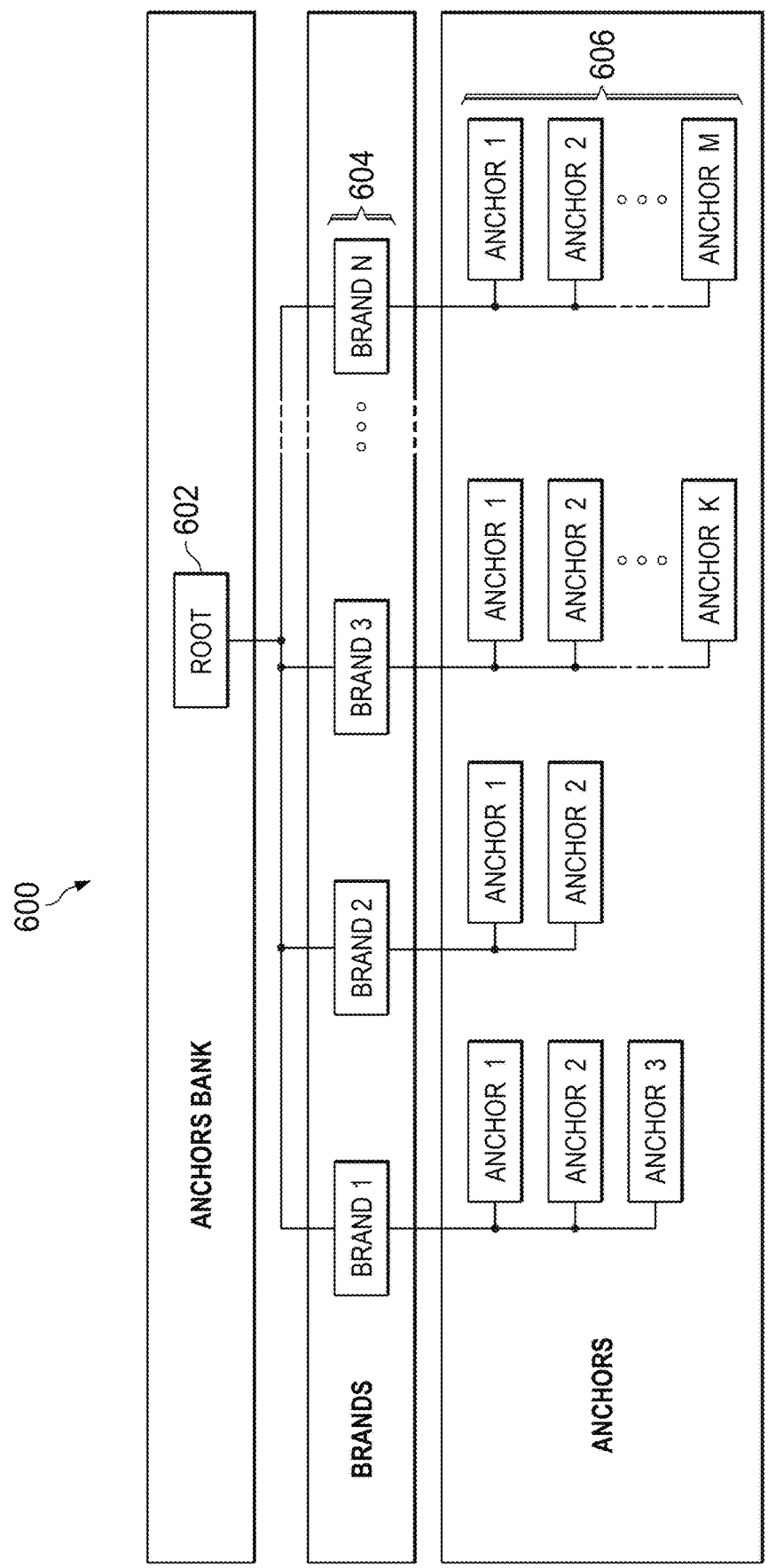
FIG. 6 depicts an anchors bank that is used to augment the siamese neural network according to this disclosure.

As depicted in FIG. 6, a bank of anchors 600 is generated and utilized to facilitate the phishing detection. As depicted in FIG. 6, the anchors bank 600 comprises a hierarchical data structure having a root node 602, and a set of child brand nodes 604. Each child brand node 604 corresponds to a brand of interest. Further, each child brand node then has associated therewith a set of child anchors 606, each representing a screenshot against which a prediction may take place. Thus, the anchors bank represents a set of predefined benign pages (typically front pages) of active brands (typically being managed by the CDN service provider) and against which the phishing protection is applied. In the preferred embodiment, each benign front-page screenshot is an anchor. Although the anchors bank 600 is depicted as a static construct, this is not a limitation. More typically, the anchors bank is a living, dynamic structure that is regularly updated (e.g., to include additional brands and anchors, to prune others, etc.). Updating may occur synchronously or asynchronously, in response to a given occurrence, or otherwise.

Figure 7:
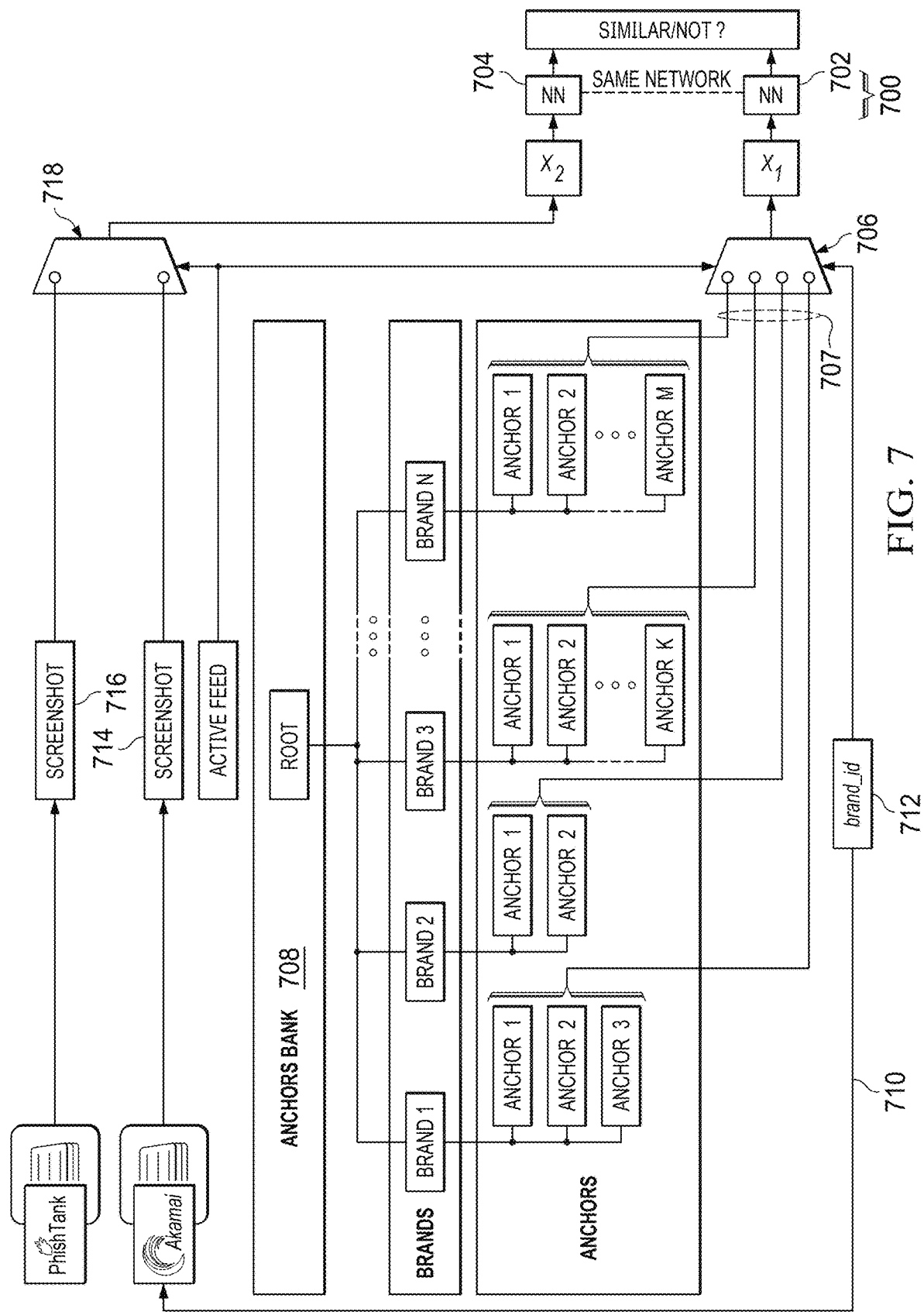
FIG. 7 depicts a representative system architecture for the phishing attack detection mechanism according to this disclosure.

FIG. 7 depicts the phishing detection system of this disclosure. As noted above, the basic notion of the detection involves comparing an input query (e.g., a page screenshot) to a pool of anchors from the anchors bank to determine with high level of confidence whether the query screenshot is pretending to be one of the anchors. The approach herein leverages the insight that learning to detect visual matches is highly correlated with phishing detections. As noted above with respect to FIG. 3, the system is designed to enable comparisons of front-page screenshots for the purpose of phishing detection, and with significant computational-efficiency. As previously described, such efficiencies are realized by providing a prior signal of the brand to be protected (the brand_id signal in FIG. 3) for the purpose of enabling a reduced set of anchors (against which the query image is to be compared) to be retrieved from the anchors bank. This feature allows a substantial reduction of the anchors search space by retrieving only the anchors pertinent to the given brand_id for the matching task. This is depicted in FIG. 7.

As depicted, siamese neural network 700 comprises the twin 702, and its associated sibling, twin 704. Twins 702 and 704 are identical, as previously noted. Twin 702 receives the first input $x_1$, which is an output of a logic function 706 that chooses the relevant subset of anchors from the anchors bank based on the brand_id signal. The function 706 also receives a set of one or more inputs 707 from the anchors bank 708, and (in this example embodiment) from a CDN data feed 710 that provides the brand identifier, brand_id, 712. As shown, the cloud-based back-end infrastructure (typically the headless browser as described above in FIG. 3) provides the candidate screenshot 714 that is being examined for phishing. In this embodiment, the phishing detection system 700 can also receive an input data point that only includes the screenshot query, in this example screenshot 716. A representative data source for the screenshot 716 is PhishTank, a network-accessible service that collects up-to-date information of websites suspected of phishing. When both types of data sources are available (as depicted), a function 718 (in this example, a Boolean OR) is used to pass the respective candidate screenshot to data input $x_2$ associated with the twin network 704. When the brand_id 712 is present, this identifier acts as a filter (or, more generally, a constraint) on which anchors of the anchor bank are made available for the phishing comparison. Thus, for example, assume the brand_id matches brand 2 in the anchors bank 708; in such case, only the anchors associated with brand 2 are supplied to the twin network 702 for comparison against the query snapshot. When the brand_id matches brand 3 in the anchor bank only the anchors associated with brand 3 are supplied to the twin network 702, and so on. As noted above, preferably the brand_id is identified by with respect to the brand or customer of the page of interest (the page being examined for phishing). Preferably, the brand_id is a unique identifier of the brand, such as the brand name. By providing this signal (of the brand/customer to be protected), the respective anchors search space is significantly reduced because only the anchors pertinent to the given brand_id are then retrieved for the matching task. When the brand_id is not provided or otherwise available, the phishing detection proceeds (using screenshot 716) where feasible by comparison against all available anchors.

In the usual case (where the brand_id is present), and as previously described, the anchors supplied to the neural network twin 702 (as data input $x_1$) represent a subset of the available anchors in the anchors bank and thus a subset of the reference website images against which the query image is to be compared.

Figure 8:
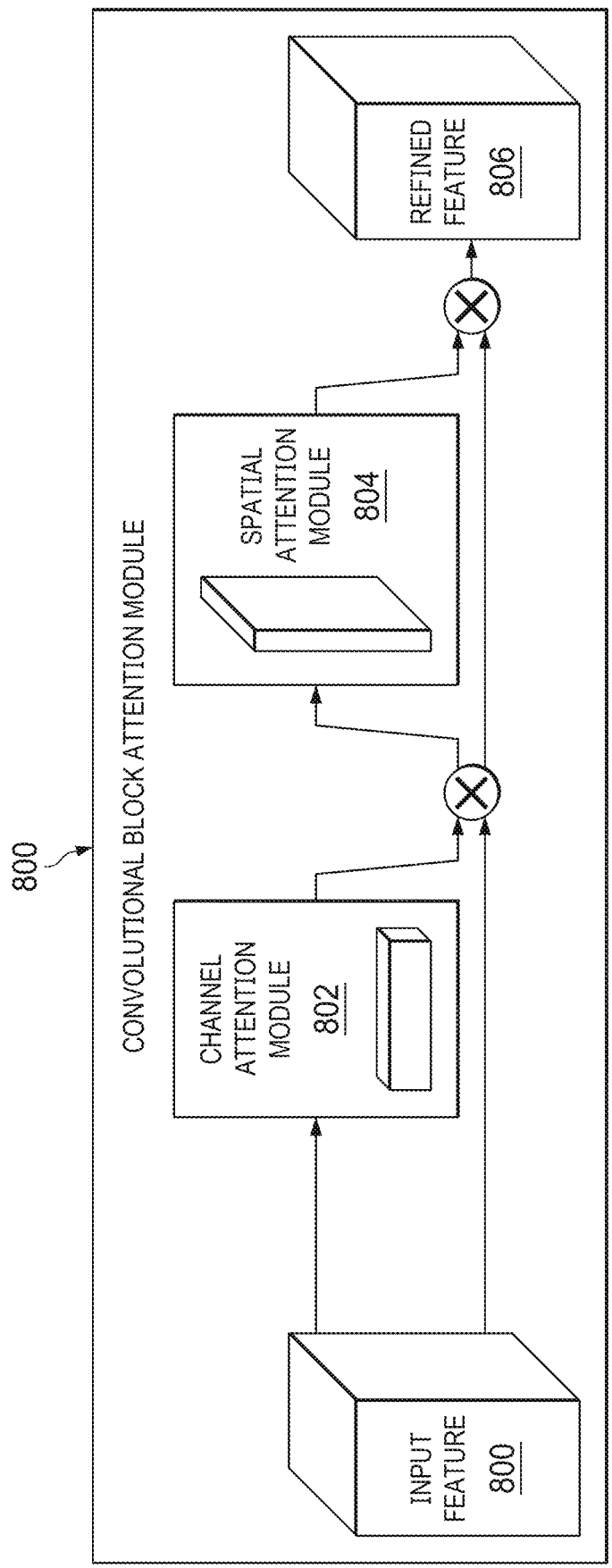
FIG. 8 depicts a representative convolutional block attention module (CBAM) that is part of the neural network architecture.
Figure 9:
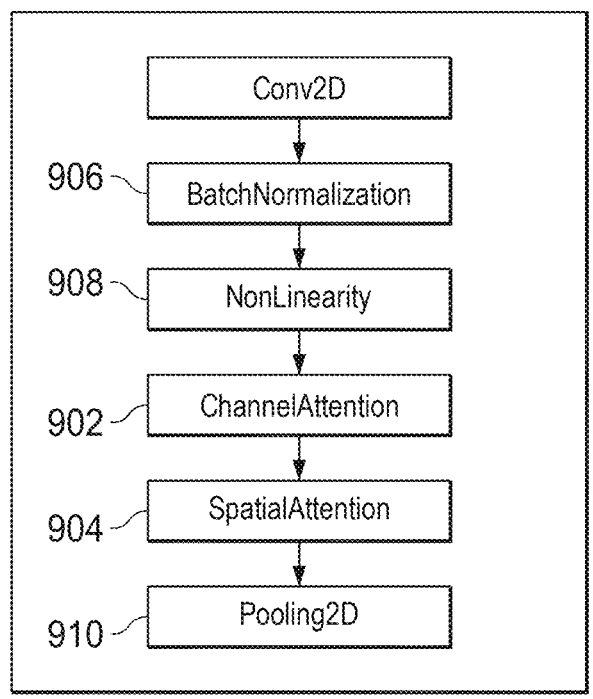
FIG. 9 depicts an instance of a particular CBAM that is used in the system architecture in a preferred implementation.
Figure 10:
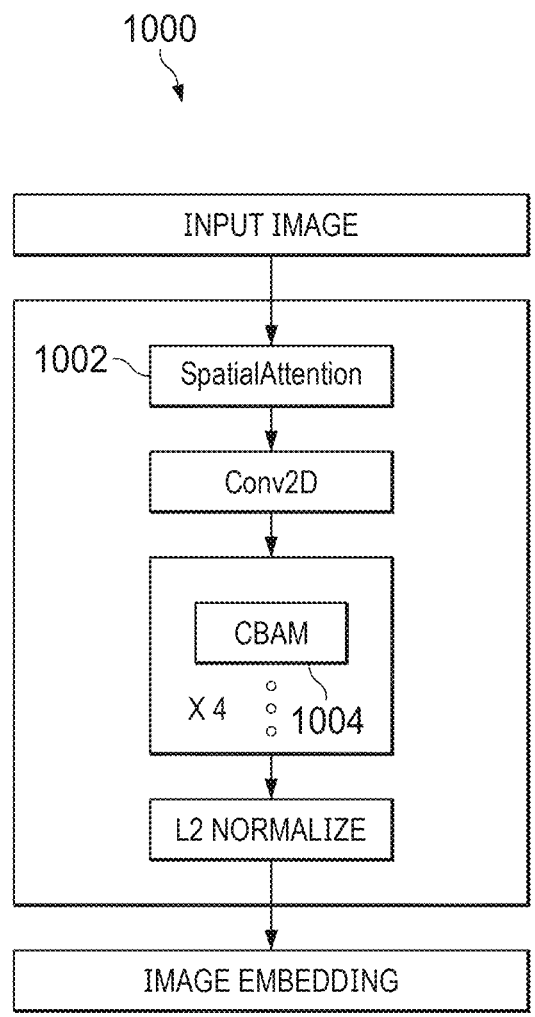
FIG. 10 depicts a more detailed representation of the full network architecture of the system.

The following describes additional details of the deep learning system components described above. As noted, the preferred approach is to leverage a Siamese neural network, wherein a same neural network is used twice (at the inference phase). Preferably, the neural network leverages both spatial- and channel-features of the processed images for effective comparison, while encouraging irrelevant parts to be overlooked. To keep the network simple and intuitive, it is configured to use attention structures. In particular, feature-processing is carried out using a Convolutional Block Attention Module (CBAM) 800 as depicted in FIG. 8. The block includes a spatial attention map/module 804, and a channel attention map/module 802 that are applied on input features 800 of convolutions to generate a set of refined features 806. FIG. 9 depicts a preferred configuration of the CBAM 900 wherein, together with the channel attention map 902 and the spatial attention map 904, the CBAM also comprises a batch normalization function 906, a non-linearity function 908, and a 2D pooling layer 910. Preferably, the network is composed of a sequence of units of this type. Based on the CBAM configured in this manner, the complete siamese neural network 1000 is as depicted in FIG. 10, wherein the first layer of spatial attention 1002 is the same layer of CBAM 1004. The network 1000 transforms an input query image (website screenshot) into an L2 normalized embedding vector in an Re unit sphere, where d denotes the dimension of the output space. The vector comprises the generated code (embedding) upon which similarities over images are computed.

More specifically, and as noted, the task of the system is to provide detection of phishing websites, typically for the benefit of registered brands/customers, wherein the list of active brands/customers is reflected within the stored anchors of the anchors bank. At time of prediction, the system compares the input query image (typically the website front-page screenshot) against a batch of selected anchors, where the relevant anchors are retrieved based on brand/customer input signal (e.g., the brand_id). More specifically, in a case where a query image is given to be associated with brand X, then only the anchors associated with this brand are considered for the task of comparison. In cases where the brand signal is missing (e.g., when a non-CDN feed is used), then the comparison is conducted against the complete set of available anchors (the complete bank), provided that the matching task is computationally-feasible. Given the available anchors set, the system encodes both the anchors and the query image by feeding them to the siamese neural network and applying a rectified cosine (typically by RELU) similarity for each anchor-query pair. If a resulting maximal score of similarity among this comparison is above a prescribed threshold (or within some configurable degree thereof), the algorithm reports a match.

The following describes further details of the training phase for the neural network. In general, a training phase is considered successful when the learned function does not show substantial under- or over-fitting with respect to the training data. Often, and in order to assure good quality of fitting for the learned model, it is a common practice to utilize an unbiased validation set against which the level of generalization of the model is inspected during the course of training; when that approach is used, the training process is halted once over-fitting starts to emerge as evidenced by a deterioration of performance of the candidate model over the validation set while continue to improve on the training set. While using an unbiased validation set is a popular and well-proven approach for supervised learning tasks, using a validation set for training (i.e., assigning data samples for the validation set) means reducing the number of patterns for the model to fit on. This may become a severe problem whenever the data of interest is dominantly discrete and scarce, which is the situation for the present use case, in that the set of phishing web pages that imitate a legitimate reference web page typically exhibits a small number of discrete patterns. Whenever small datasets (such as the present one are involved), dividing the whole data into training and validation sets may lead to a non-optimal trained model, as the training data set may not be considered representative.

Thus, a preferred training approach herein instead preferably utilizes the complete dataset as a training set while also providing a signal for monitoring the fit quality of the model. A preferred approach adopts a Probably Approximately Correct (PAC)-Bayesian learning framework. In this approach, a penalty term that involves pairs of mini batches from the training set is used to monitor the level of fitting of the model. Furthermore, by adopting the PAC-Bayesian framework, a probabilistic upper-bound is established on the penalty term, which in turn is further simplified into L2-norm of the difference of gradients of the model's trainable parameters, calculated over the different mini-batches. This approach thus leverages the metric of gradient disparity (GD) to monitor the level of fitting of the trained model.

Figure 11:
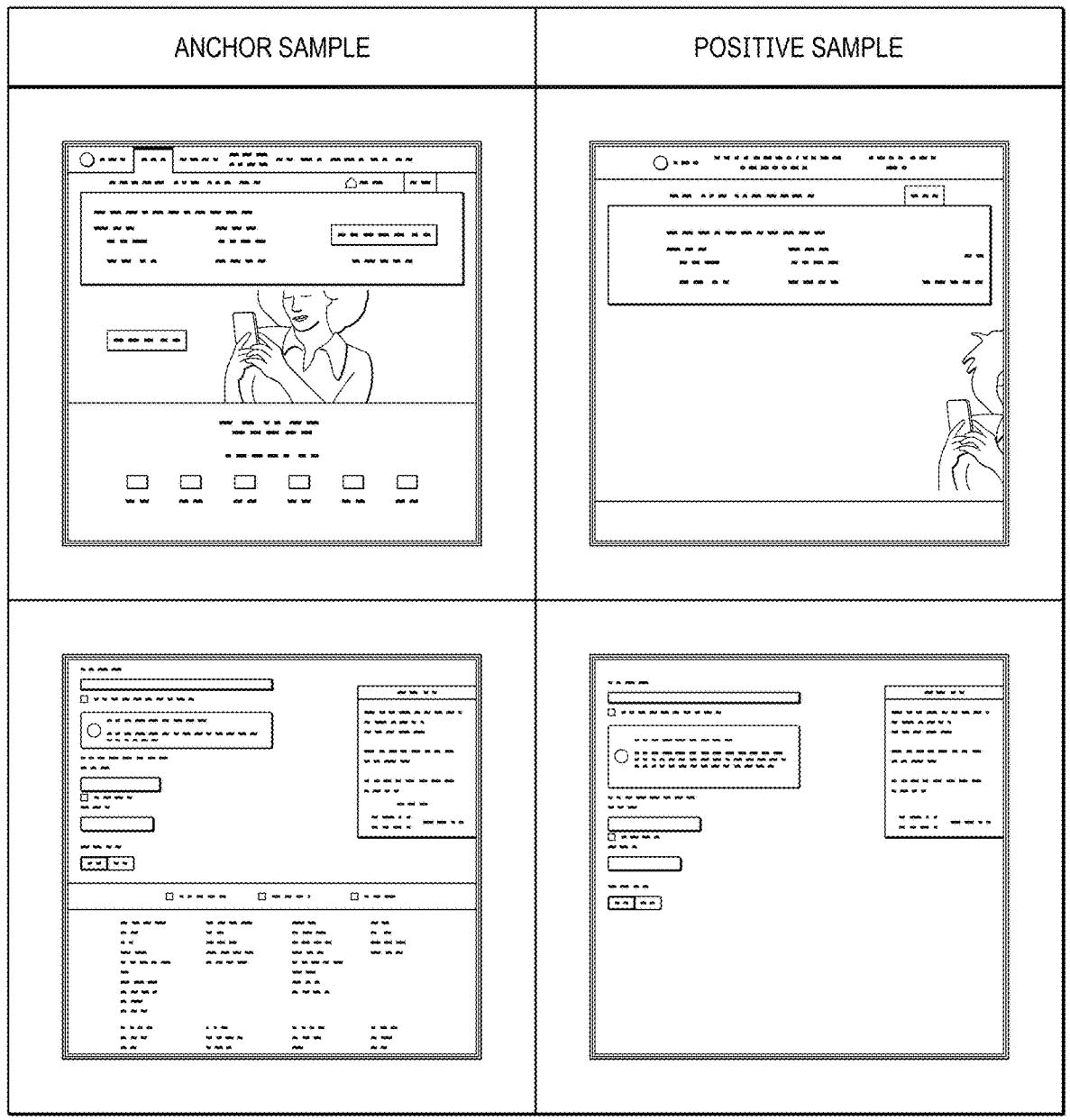
FIG. 11 depicts several representative examples of training data used to train the neural network.

Generally, the network's learning phase is done via few-shot training. Accordingly, the dataset used for training the model is composed as follows. For every anchor in the anchors bank, pertinent positive screenshot examples (that exhibit phishing) are collected. Each of the positive examples is a screenshot of a true phishing website that at least visually imitates the associated anchor. Behind these positive examples stand phishing websites that to some extent imitate the front page of the corresponding anchor. The table in FIG. 11 depicts two examples of (anchor, positive) pairs, with the left column representing the anchors and the right column the imitated front page. As can be seen, the phishing websites show high similarity to the original targeted websites, even though the front pages of the phishing websites are sufficiently different from the pertinent anchors such that a basic pixel-wise comparison may fail as an efficient similarity metric. This shortcoming calls for learning a (latent) embedding space for optimal comparison towards phishing detections.

To this end, it should be noted that, most often, the number of unique positive samples per anchor available for training is of 0 (1) cardinality samples. As explained above, this reality of sparsity underlies the preferred choice to train the model without setting aside a validation set, instead relying on the metric of gradient disparity over the training data for monitoring model fit quality.

Preferably, and as depicted in FIG. 12, the network trained while subjected to a Triplet Loss function. Triplet loss minimizes the distance between an anchor and a positive, both of which have the same identity, and maximizes the distance between the anchor and a negative of a different identity. The idea of using the triplet loss is to learn embedding representation for each image in a way that images of the same group (i.e., an anchor and its positives) are found close in space in comparison with images of different groups. This aims at generating a solution where the network is embedding closely in space with respect to an anchor and its pertinent positive samples, while maximizing the distance between the anchor and the corresponding negative samples. More formally, if $x_i^a$ is an anchor sample (original website front page screenshot) and $x_i^p$ is a positive sample (a screenshot of a phishing website imitating $x_i^a$), and $x_i^n$ is a negative sample (most generally, a screenshot of any other nonrelated website front page), then the optimization constraint that is being enforcing is as follows:

$$\|f(x_i^a) - f(x_i^p)\|_2^2 + \alpha < \|f(x_i^a) - f(x_i^n)\|_2^2$$

$$\forall (x_i^a, x_i^p, x_i^n) \in \mathcal{T}$$

where $\alpha$ is an enforced minimal distance margin, and T represents all possible triplets from the training set and is of cardinality N. The total loss to minimize is given by:

$$\mathcal{L} = \sum_{i=1}^{N} \left[ \|f(x_i^a) - f(x_i^p)\|_2^2 - \|f(x_i^a) - f(x_i^n)\|_2^2 + \alpha \right]_+$$

In this approach, there is no need to introduce to the optimization algorithm all of the triplets from the training set, and it is better to focus on triplets that generate positive loss during training. This approach reduces the time necessary to train the network. As an implementation, the TensorFlow machine learning platform may be used. This platform includes the TripletLoss function, which is a loss function that trains a neural network to closely embed features of the same class while maximizing the distance between embeddings of different classes. To do this an anchor is chosen along with one negative and one positive sample. A preferred embodiment uses triplets known as "Semi-Hard," which are triplets where the negative is farther from the anchor than the positive, but still produces a positive loss. To efficiently find these triplets, preferably online learning is used and training uses only the Semi-Hard examples in each batch. To monitor fit quality, and specifically to use an early stopping, a non-normalized gradient disparity signal (e.g., with patience parameter set to 10) is used. In practice, this means that, instead of using a validation set for inspecting the fit quality of model, the training set is used again to produce the GD signal (without any normalization) with s parameter (e.g., set to 5). The approach may use an RMSProp optimizer with learning rate $10^{-3}$.

Typically, the training is carried out in a GPU-based machine. Once the model is trained, it is instantiated in a detection process or machine as previously described. The model may be re-trained with additional or updated training data.

The techniques herein may be implemented in association with other network security functions and operations. Typically, the phishing detection mechanism acts as a front-end to some other security system or device, e.g., a system that protects resources (such as web sites or pages, web or other applications, etc.) from abuse.

Preferably, the threshold between a score representing a trustworthy and an untrustworthy (phishing) site/page is configurable.

When implemented in a CDN, configurations at the CDN edge may be used to coordinate collecting data to be used in initial data modeling, and to facilitate the detection and/or prevention operations based on that data.

The approach is reliable and scalable and operates in real-time with online computation demand, with detection occurring on average on a one (1) second scale.

Although not intended to be limiting, the detection is performed with low latency, reliably and at large scale.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel®-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What I claim is as follows:

1. A method of protecting an online system from a phishing attack, comprising:
   receiving a query image associated with a website page;
   receiving a dataset representing a set of reference website images against which the query image is to be applied;
   applying an identifier to the dataset to identify a subset of reference website images against which the query image is to be applied, wherein the identifier is a brand associated to the website page;
   applying the query image to a first instance of a neural network, and applying the subset of reference website images to a second instance of the neural network, the neural network generating an output that indicates a likelihood that the website page is a phishing page; and
   upon a determination that that the website page is a phishing page, generating signaling information to cause a control system to take a given mitigation action with respect to the website page.

2. The method as described in claim 1 wherein the first and second instances comprise a siamese neural network having attention layers.

3. The method as described in claim 1 wherein the first and second instances of the neural network have identical structure and weight parameters.

4. The method as described in claim 1 wherein each instance of the neural network comprises a convolutional block attention module that uses spatial- and channel-features of inputs for inferencing.

5. The method as described in claim 1 wherein the dataset representing the set of reference website pages comprises a bank of anchors associated with a set of active brands against which phishing protection is being applied.

6. The method as described in claim 5 wherein the bank of anchors comprises one or more brands and, for each brand, a set of one or more anchors, wherein each anchor in the set of anchors corresponds to a screenshot of a reference website page.

7. The method as described in claim 1 further including few-shot learning-based training the neural network against a set of training data comprising the set of reference website images and a set of associated positive phishing examples.

8. The method as described in claim 7 wherein, for a given website image, the training generates an embedding into a feature space such that a squared distance between all website images of a website of a same brand is small, and wherein a squared distance between a pair of website images from websites of different brands is large.

9. The method as described in claim 8 wherein the training uses a triplet loss function.

10. The method as described in claim 9 wherein the triplet loss function guarantees that a website image of the same brand is closer to all other website images of the same brand than to any website image of at least one other brand.

11. The method as described in claim 7 wherein a fit quality of the neural network with respect to the set of training data is monitored using a gradient disparity metric.

12. The method as described in claim 1 wherein the query image is received in response to occurrence of a security event at a server.

13. The method as described in claim 12 further including:
responsive to the security event, fetching the website page; and
generating a screenshot of the fetched website page.

14. The method as described in claim 1 wherein the website page is associated with a content provider that uses a content delivery network (CDN), and wherein the identifier is received from a CDN data feed.

15. An apparatus for protecting an online system from a phishing attack, comprising:
one or more hardware processors; and
computer memory holding computer program code executed by the one or more hardware processors and configured to:
receive a query image associated with a website page;
receive a dataset representing a set of reference website images against which the query image is to be applied;
apply an identifier to the dataset to identify a subset of reference website images against which the query image is to be applied, wherein the identifier is a brand associated to the website page;
apply the query image to a first instance of a neural network, and applying the subset of reference website images to a second instance of the neural network, the neural network generating an output that indicates a likelihood that the website page is a phishing page; and
upon a determination that the website page is a phishing page, generate signaling information to cause a control system to take a given mitigation action with respect to the website page.

16. The apparatus as described in claim 15 wherein the first and second instances of the neural network comprise a siamese neural network having attention layers.

17. The apparatus as described in claim 16 wherein the first and second instances of the neural network have identical structure and weight parameters.

18. The apparatus as described in claim 15 wherein each instance of the neural network comprises a convolutional block attention module configured to use spatial- and channel-features of inputs for inferencing.

19. The apparatus as described in claim 16 wherein the computer program code is further configured to train the neural network against a set of training data using few-shot learning, the set of training data comprising the set of reference website images and a set of associated positive phishing examples.

20. The apparatus as described in claim 19 wherein, for a given website image, the computer program code generates an embedding into a feature space such that a squared distance between all website images of a website of a same brand is small, and wherein a squared distance between a pair of website images from websites of different brands is large.

21. A computer program product comprising a non-transitory computer readable medium, the computer readable medium comprising computer program code configured to execute in one or more hardware processors to protect an online system from a phishing attack, the computer program code configured to:
receive a query image associated with a website page;
receive a dataset representing a set of reference website images against which the query image is to be applied;
apply an identifier to the dataset to identify a subset of reference website images against which the query image is to be applied, wherein the identifier is a brand associated to the website page;
apply the query image to a first instance of a neural network, and applying the subset of reference website images to a second instance of the neural network;
generate an output that indicates a likelihood that the website page is a phishing page; and
upon a determination that that the website page is a phishing page, generate signaling information to cause a control system to take a given mitigation action with respect to the website page.

22. A method of protecting an online system from a phishing attack, comprising:
few-shot learning-based training a neural network using a set of training data comprising screenshots of reference website pages together with a set of associated positive phishing examples;
during training, monitoring a fit quality of the neural network with respect to the training data using a gradient disparity metric;
following training of the neural network:
receiving a query screenshot associated with a website page; and
applying the query screenshot to a first instance of the neural network, and applying at least some of the screenshots of the reference website pages to a second instance of the neural network, thereby generating an output that indicates a likelihood that the website page is a phishing page to:
receiving a query screenshot associated with a website page;
applying an identifier to the screenshots of the reference website pages to identify a subset of screenshots of reference website pages against which the query screenshot is to be applied, wherein the identifier is a brand associated to the website page;
applying the query screenshot to a first instance of the neural network, and applying at least the subset of the screenshots of the reference website pages to a second instance of the neural network, thereby generating an output that indicates a likelihood that the website page is a phishing page, and
upon a determination that that the website page is a phishing page, generating signaling information to cause a control system to take a given mitigation action with respect to the website page.

* * * * *

UNITED STATES PATENT AND TRADEMARK OFFICE
CERTIFICATE OF CORRECTION

PATENT NO. : 12,323,461 B2
APPLICATION NO. : 18/135778
DATED : June 3, 2025
INVENTOR(S) : Nadav George Costa Page 1 of 1

It is certified that error appears in the above-identified patent and that said Letters Patent is hereby corrected as shown below:

In the Claims

Column 14, Lines 30-38, cancel the text beginning with "receiving a query" to and ending "to:".

Signed and Sealed this
Eighth Day of July, 2025

Coke Morgan Stewart
*Acting Director of the United States Patent and Trademark Office*